United States Patent
Julian et al.

(10) Patent No.: US 9,212,569 B2
(45) Date of Patent: Dec. 15, 2015

(54) SYSTEMS, METHODS, AND APPARATUS FOR DETERMINING ONLINE STRESS AND LIFE CONSUMPTION OF A HEAT RECOVERY STEAM GENERATOR

(75) Inventors: William Barrett Julian, Salem, VA (US); Ashok Dattatraya Acharya, Salem, VA (US); Joel Donnell Holt, Schenectady, NY (US); Robert John Gdaniec, Schenectady, NY (US); Andrew John Groth, Salem, VA (US)

(73) Assignee: General Electric Company, Schenectady, NY (US)

(*) Notice: Subject to any disclaimer, the term of this patent is extended or adjusted under 35 U.S.C. 154(b) by 509 days.

(21) Appl. No.: 12/907,187

(22) Filed: Oct. 19, 2010

(65) Prior Publication Data
US 2012/0095701 A1   Apr. 19, 2012

(51) Int. Cl.
| | |
|---|---|
| G01L 1/00 | (2006.01) |
| F01K 13/00 | (2006.01) |
| G07C 3/00 | (2006.01) |
| F22B 37/00 | (2006.01) |
| G01M 5/00 | (2006.01) |

(52) U.S. Cl.
CPC ............ *F01K 13/003* (2013.01); *F22B 37/00* (2013.01); *G01M 5/0033* (2013.01); *G07C 3/00* (2013.01)

(58) Field of Classification Search
CPC ..... G07C 3/00; F01K 13/003; G01M 5/0033; F22B 37/00
See application file for complete search history.

(56) References Cited

U.S. PATENT DOCUMENTS

| | | | |
|---|---|---|---|
| 5,410,883 A | 5/1995 | Nigawara et al. | |
| 8,090,545 B2 | 1/2012 | Gobrecht et al. | |
| 2003/0083827 A1* | 5/2003 | Chow et al. | ............ 702/34 |
| 2007/0169721 A1 | 7/2007 | Weisenstein et al. | |
| 2009/0138211 A1 | 5/2009 | Gobrecht et al. | |
| 2009/0292436 A1 | 11/2009 | D'Amato et al. | |
| 2010/0100248 A1* | 4/2010 | Minto et al. | ............ 700/287 |

FOREIGN PATENT DOCUMENTS

| | | |
|---|---|---|
| CN | 101004259 A | 7/2007 |
| CN | 101292076 A | 10/2008 |
| CN | 101520171 A | 9/2009 |
| EP | 2 444 597 A2 | 4/2012 |

(Continued)

OTHER PUBLICATIONS

Chinese Office Action issued in connection with corresponding CN Application No. 201110340208.4 dated Jun. 3, 2014.

(Continued)

*Primary Examiner* — Paul D Lee
(74) *Attorney, Agent, or Firm* — Sutherland Asbill & Brennan LLP

(57) ABSTRACT

Certain embodiments of the invention may include systems, methods, and apparatus for determining online stress and life of a heat recovery steam generator. According to an example embodiment of the invention, a method for assessing components of a heat recovery steam generator (HRSG) is provided. The method includes receiving HRSG design parameters; monitoring thermal stress data from one or more temperature sensors in communication with one or more HRSG components; and determining cycle-related life consumption data associated with the one or more HRSG components based at least in part on the HRSG design parameters and the monitored thermal stress data.

20 Claims, 2 Drawing Sheets

(56) References Cited

FOREIGN PATENT DOCUMENTS

| | | |
|---|---|---|
| EP | 2444597 A2 | 4/2012 |
| JP | 0875107 A | 3/1996 |
| JP | 2003065984 A | 3/2003 |
| WO | 2007/045537 A2 | 4/2007 |
| WO | 2014/003930 A2 | 1/2014 |

OTHER PUBLICATIONS

International Search Report and Written Opinion issued in connection with related WO Patent Application No. PCT/US2013/042338 dated Jul. 7, 2014.

PCT International Search Report and Written Opinion for International Application No. PCT/US2013/042338 mailed Jul. 7, 2014.

* cited by examiner

SYSTEMS, METHODS, AND APPARATUS FOR DETERMINING ONLINE STRESS AND LIFE CONSUMPTION OF A HEAT RECOVERY STEAM GENERATOR

FIELD OF THE INVENTION

This invention generally relates to heat recovery steam generators and, in particular, to determining online stress and life consumption of heat recovery steam generator pressure part components.

BACKGROUND OF THE INVENTION

Heat recovery steam generators (HRSGs) are one of four major components typically associated with power generation. The other major components are the gas turbine, the steam turbine and the generator(s). The HRSG recaptures the excess heat energy that is produced in the turbine's combustion process, and such energy can be utilized in a steam turbine to generate additional usable energy.

Power generation system owners often need to manage the startup and shutdown cycles of the gas turbine system based on a number of factors including energy demand, fuel prices, energy prices, predicted load, power system conditions, emissions, etc. Therefore, the gas turbine components must withstand numerous heating and cooling cycles. Such cycling tends to create mechanical wear and fatigue in the various parts due to thermal expansion and contraction.

One of the challenges facing gas turbine operators involves balancing the power output to service demand cycles and transients without creating unnecessary wear or damage to the multitude of parts that make up the HRSG.

BRIEF SUMMARY OF THE INVENTION

Some or all of the above needs may be addressed by certain embodiments of the invention. Certain embodiments of the invention may include systems, methods, and apparatus for determining online stress and life consumption of a heat recovery steam generator.

According to an example embodiment of the invention, a method is provided for assessing components of a heat recovery steam generator (HRSG). The method can include receiving HRSG design parameters; monitoring thermal stress data from one or more temperature sensors in communication with one or more HRSG components; and determining cycle-related life consumption data associated with the one or more HRSG components based at least in part on the HRSG design parameters and the monitored thermal stress data.

According to another example embodiment, a system is provided for assessing components of a heat recovery steam generator (HRSG). The system can include a heat recovery steam generator (HRSG), one or more sensors in communication with one or more components associated with the HRSG, and one or more processors in communication with the one or more sensors. The one or more processors may be configured for receiving HRSG design parameters, monitoring thermal stress data from the one or more sensors, and determining cycle-related life consumption data associated with the one or more HRSG components based at least in part on the HRSG design parameters and the monitored thermal stress data.

According to another example embodiment, an apparatus is provided for assessing components of a heat recovery steam generator (HRSG). The apparatus may include one or more processors in communication with one or more sensors and configured for receiving HRSG design parameters, monitoring thermal stress data from one or more sensors, and determining cycle-related life consumption data associated with the one or more HRSG components based at least in part on the HRSG design parameters and the monitored thermal stress data.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable determining an amount of wear, lifetime reduction, lifetime consumption, and/or damage associated with heat recovery steam generator components as a function of cycling or transients. According to certain example embodiments, sensors may be utilized to measure values such as temperature, pressure and/or stress. In an example embodiment, the measured values may be utilized to determine thermal-induced stresses, mechanical stresses and/or creep stress. In an example embodiment, multiple sensors may be utilized for measuring values associated with the various components of the heat recovery steam generator (HRSG). In accordance with example embodiments of the invention, HRSG design parameters may be input into a standards-based model for determining temperature and pressure induced stresses on the various HRSG components.

According to an example embodiment, operational flexibility guidelines, limits, or other criteria associated with the gas turbine system can be based, at least in part, on the measured values, which may be utilized to provide information regarding regions of operation that may increase the chance of wear or damage to the HRSG components. In an example embodiment, a risk vs. reward analysis may be performed to determine whether to allow the HRSG to operate in certain modes. For example, if demand is high for energy and if the price of energy is high enough, bringing a system online quickly, or pushing the system to certain limits, may justify the extra wear and tear. In an example embodiment, a system may provide valuable information to the operator for keeping the system within safe bounds. In another example embodiment of the invention, the HRSG may be monitored for signs of stress that may indicate a need for replacing a part before a catastrophic failure occurs.

According to example embodiments of the invention, various sensors, processors, modules, and data systems that may be utilized for assessing stresses associated with the HRSG components will now be described with reference to the accompanying figures.

Figure 1:
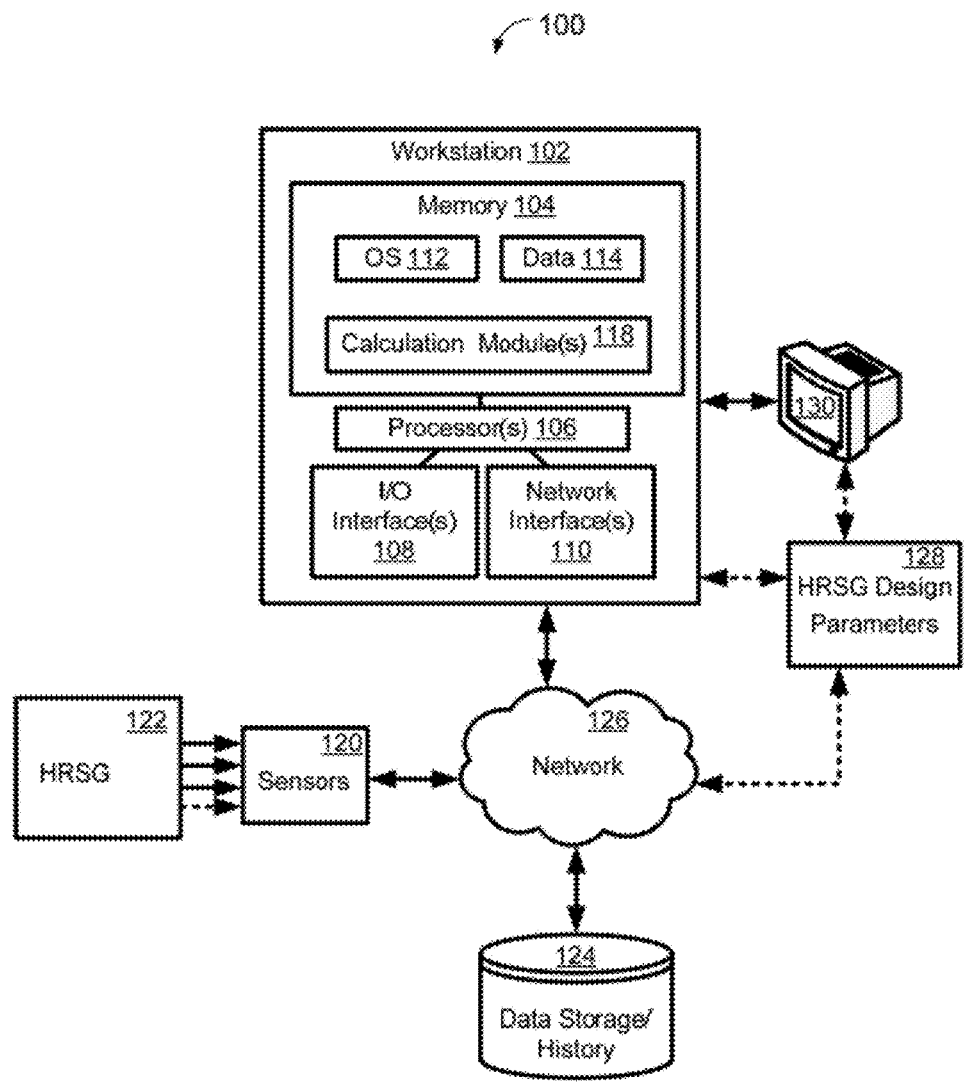
FIG. 1 is a block diagram of an illustrative heat recovery steam generator online stress and life monitoring system according to an example embodiment of the invention.

FIG. 1 illustrates an example system 100 for assessing components related to a heat recovery steam generator (HRSG). According to example embodiments of the invention, the HRSG system 100 may include a workstation 102, a network 126, a data storage/history memory device or system 124, sensors 120, and an HRSG 122. In an example embodiment, HRSG design parameters 128 may be entered into the workstation 102 by a terminal or remote workstation 130. In other example embodiments of the invention, the HRSG design parameters 128 may already be present in the workstation 102. In an example embodiment, the HRSG design parameters 128 may be updated based on the history of measurement data, or based on manual or automatic input.

According to an example embodiment of the invention, the workstation 102 may include one or more memories 104, one or more processors 106, and one or more input/output (I/O) interfaces 108. In accordance with an example embodiment of the invention, the workstation 102 may also include one or more network interfaces 110 for communication with the network 126. In an example embodiment, the memory 104 associated with the workstation 102 may include an operating system (OS) 112, data 114, and one or more calculation modules 118 for determining wear or life consumption associated with the HRSG components.

According to an example embodiment, one or more sensors 120 may be in communication with, and utilized to monitor temperature, pressure, and/or mechanical conditions (strain, position, load, etc.) of the various components of the HRSG 122. The sensors 120 may include signal condition equipment and/or analog to digital converters for converting the analog signals to digital signals for communication to the workstation 102 via a network 126, or by other direct or wireless inputs to the workstation 102. In other example embodiments, analog sensors may communicate directly with the workstation 102 via analog input/output interfaces 108. In an example embodiment, a local or remote data storage/history memory device or system 124 may be utilized for saving data associated with monitoring the HRSG stresses. In an example embodiment, the data storage/history memory device or system 124 may also be utilized for storing and/or retrieving HRSG design parameters 128 for use with the calculation module(s) 118.

According to an example embodiment, the system 100 may be utilized for assessing components related to the HRSG 122. For example, the HRSG design parameters 128 may be utilized, and thermal stress data from one or more temperature sensors in communication with one or more HRSG 122 components may be monitored. According to an example embodiment, cycle-related life consumption data associated with the one or more HRSG 122 components may be determined based at least in part on the HRSG design parameters 128 and the monitored thermal stress data.

In an example embodiment, mechanical stress data from one or more pressure sensors in communication with the one or more HRSG 122 components may also be utilized to determine cycle-related life consumption data. According to an example embodiment of the invention, the determined cycle-related life consumption data may be output, stored and/or used to control one or more operations associated with the gas turbine system. In an example embodiment, the HRSG design parameters 128 may include one or more of dimensions, tolerances, construction details, material details, weld details, heat balance envelope, operational envelope, or design envelope associated with the one or more HRSG 122 components. According to example embodiments of the invention, additional parameters may be utilized by the calculation modules 118, including material test results, actual material properties (rather than generic), actual dimensions of the components (rather than designed dimensions), and quality control (including x-ray test data of welds, or weld geometry inspection measurement data for example).

According to example embodiments of the inventions, sensors can be real, virtual or derived for measurement of temperature, differential temperature, pressure, strain, position, load or any other physical characteristic. According to example embodiments, implementation may be applied to HRSGs or other boiler types.

In an example embodiment, determining cycle-related life consumption data may be based at least in part on one or more of stress cycle counting or load cycle counting. In an example embodiment, cycle-related life consumption data and calculations may comply with one or more standards for design and dimensioning of boilers. For example, the European EN 12952-1, -2, -3, and -4 standards for design and dimensioning of shell boilers may serve for modeling the one or more calculation modules 118. In an example embodiment, standards may be adapted for cycle counting, real time tracking, and/or calculating mechanical and thermal stresses that may lead to fatigue and damage of the components associated with the HRSG 122.

According to example embodiments, the sensors 120 may include temperature sensors that may be used to provide measured data for high fidelity metal thermally induced stress and creep calculations. In an example embodiment, the sensors may be chosen to withstand the high temperatures of the HRSG components. For example, sensors 120 may include, but not limited to, thermopiles, RTDs (resistive thermal devices), infrared sensors, etc. as appropriate for each particular part or application. According to example embodiments of the invention, the sensors 120 may include component pressure sensors that can provide measured input data for induced mechanical stress calculations.

According to an example embodiment, instantaneous mechanical and thermal stresses may be calculated from the sensor data to determine fatigue damage. According to an example embodiment, instantaneous creep stress may be calculated and used as input data in a damage calculation for determining the resulting cycle and accumulated damage. According to an example embodiment of the invention, cycle counting methodology (based on a rainfall methodology) may be utilized for determining cycle-related damage. In an example embodiment, monitoring and calculations can be performed for each component associated with the shell and nozzle of the HRSG. According to example embodiments of the invention, components that are known to undergo high stress in a cycle may be utilized for an overall view of the life consumption of the complete HRSG system.

In accordance with example embodiments of the invention, the HRSG system 100 may determine stress, cycle, and/or transient-related life consumption of the components associated with the HRSG 122. The life consumption may be based at least in part on the configuration and/or materials of the system. In an example embodiment, the stress or life consumption information may be utilized as part of the general gas turbine control system or control loop for modifying any of the operating parameters. According to an example embodiment, the HRSG system 100 may be universal and applicable to any boiler configuration.

In accordance with example embodiments of the invention, the HRSG system 100 may include a stress and life monitoring calculation engine that may receive relevant data from the sensors 120 (for example, pressure and HRSG compartment metal temperatures). In an example embodiment, the data from the sensors 120 may be provided via a distributed control system. In an example embodiment, the calculation engine (which according to an example embodiment, may include calculation modules 118) may calculate real-time thermal, mechanical and creep stress, and the calculation engine may totalize the stress interactions to aggregate specific component metallurgical damage. In an example embodiment, the calculated parameters may then be communicated to a control system to allow aggregation, historical retention and control schemes to be implemented.

In an example embodiment, the sensors 120 may be utilized to calculate stresses associated with the HRSG 122, based at least in part on the various HRSG 122 component pressures and temperatures. When a cycle is detected, the calculation modules 118 associated with the HRSG system 100 may determine, store, and provide information regarding wear and/or damage associated with the various HRSG 122 components. In an example embodiment, components associated with the HRSG 122 may include, but are not limited to drums (high pressure steam drum, medium pressure steam drum, low pressure steam drum), steam manifolds, superheaters, economizers, attemperators, etc. In an example embodiment, the wear and/or damage information may be utilized in a risk vs. reward calculation to take advantage of operational circumstances, for example, achieving a balance between market incentives and the lifetime of the HRSG 122 components.

Figure 2:
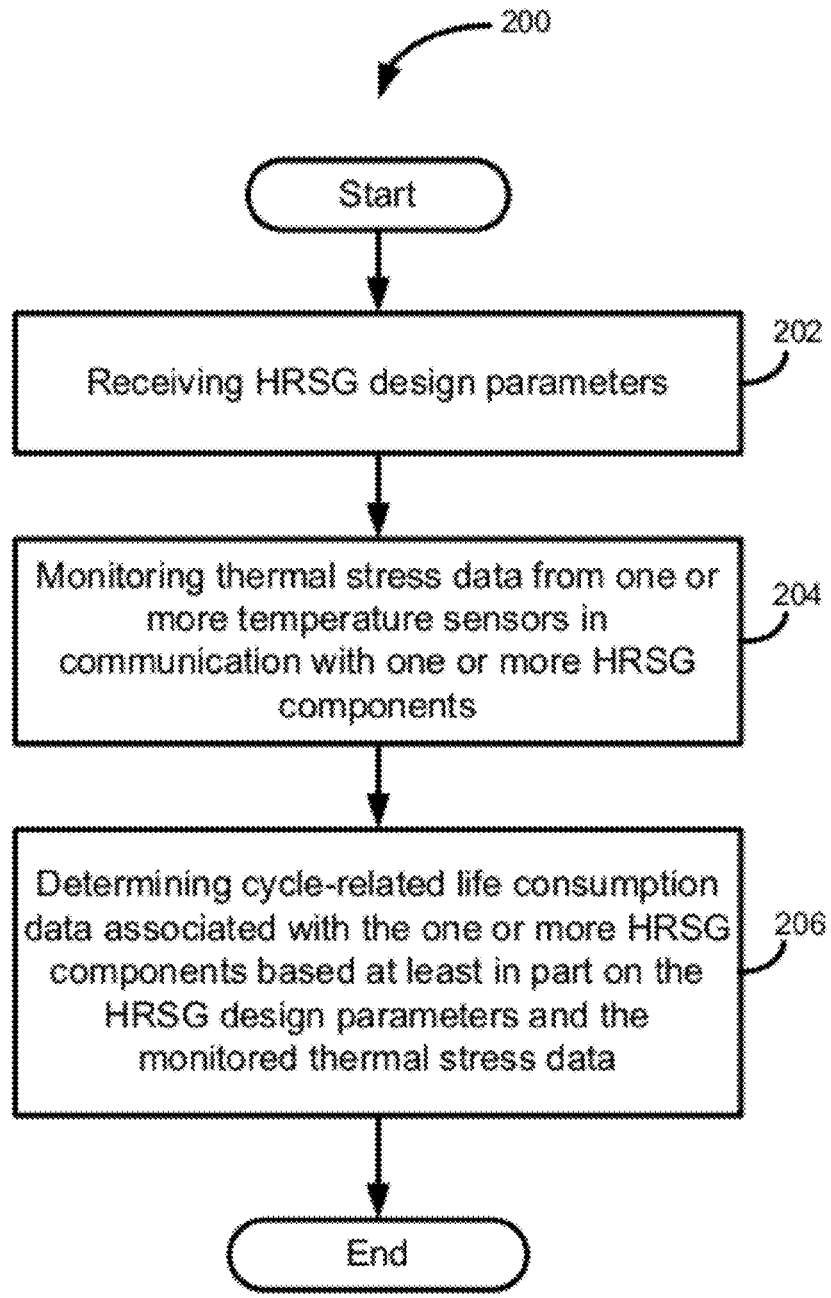
FIG. 2 is a flow diagram of an example method according to an example embodiment of the invention.

An example method 200 for assessing components related to a heat recovery steam generator (HRSG) will now be described with reference to the flow diagram of FIG. 2. The method 200 starts in block 202, where according to an example embodiment of the invention, the method 200 includes receiving HRSG design parameters. In block 204, the method 200 includes monitoring thermal stress data from one or more temperature sensors in communication with one or more HRSG components. In block 206, the method 200 includes determining cycle-related life consumption data associated with the one or more HRSG components based at least in part on the HRSG design parameters and the monitored thermal stress data. The method 200 ends after block 206.

Accordingly, example embodiments of the invention can provide the technical effects of creating certain systems, methods, and apparatus that provide measured and instantaneous cycle-related wear and damage information for an HRSG. Example embodiments of the invention can provide the further technical effects of providing systems, methods, and apparatus for determining the cycle-related wear and damage information based on a combination of modeling and sensor information. Accordingly, example embodiments of the invention can provide the further technical effects of creating certain systems, methods, and apparatus that provide HRSG stress, life monitoring, and damage assessment based on current real-time measured operational stresses, which are standards-based.

In example embodiments of the invention, the HRSG system 100 may include any number of hardware and/or software applications that are executed to facilitate any of the operations. In example embodiments, one or more I/O interfaces may facilitate communication between the HRSG system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the HRSG system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the HRSG system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems. As desired, embodiments of the invention may include the HRSG system 100 with more or less of the components illustrated in FIG. 1.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for operating components of a heat recovery steam generator (HRSG), comprising:
   receiving, via at least one processor, one or more HRSG operational design parameters;
   receiving, via at least one processor, one or more HRSG physical design parameters;
   monitoring, via at least one processor, real-time thermal stress data and real-time transient data from one or more sensors in communication with one or more HRSG components;
   determining, via at least one processor, real-time transient-related life consumption data and real-time cycle-related life consumption data associated with the one or more HRSG components based at least in part on the HRSG operational design parameters, physical design parameters, and the monitored thermal stress data and transient data, wherein the transient-related life consumption data and cycle-related life consumption data comprise at least one of measured calculations or instantaneous calculations;
   receiving real-time indications for a consumer demand for energy and a corresponding price for the energy;
   based at least in part on the transient-related life consumption data, cycle-related life consumption data, demand for energy, and corresponding price for the energy, providing a recommendation to operate the HRSG in a particular mode, wherein the particular mode is at least a control scheme, data aggregation, historical retention, or a repair scheme; and
   based at least in part on the recommendation, implementing, via at least one processor, the particular mode.

2. The method of claim 1, further comprising monitoring mechanical stress data from one or more pressure sensors in communication with the one or more HRSG components.

3. The method of claim 2, further comprising determining real-time transient-related life consumption data and real-time cycle-related life consumption data associated with the one or more HRSG components based at least in part on the monitored mechanical stress data.

4. The method of claim 1, wherein receiving the HRSG physical design parameters comprises receiving one or more of dimensions, tolerances, construction details, material details, weld details, heat balance envelope, operational envelope, design envelope, material testing properties, manufacture data, quality control data, or inspection data associated with the one or more HRSG components.

5. The method of claim 1, further comprising outputting and storing determined real-time cycle-related life consumption data.

6. The method of claim 1, wherein determining real-time cycle-related life consumption data is based at least in part on one or more of stress cycle counting or load cycle counting.

7. The method of claim 1, wherein determining real-time cycle-related life consumption data complies with one or more standards for design and dimensioning of boilers.

8. A system for operating components of a heat recovery steam generator (HRSG), comprising:
   a heat recovery steam generator (HRSG);
   one or more sensors in communication with one or more HRSG components; and
   one or more processors in communication with the one or more sensors and configured for:
   receiving, via at least one processor, one or more HRSG operational design parameters;
   receiving, via at least one processor, one or more HRSG physical design parameters;
   monitoring, via at least one processor, real-time thermal stress data and real-time transient data from one or more sensors in communication with one or more HRSG components;
   determining, via at least one processor, real-time transient-related life consumption data and real-time cycle-related life consumption data associated with the one or more HRSG components based at least in part on the HRSG operational design parameters, physical design parameters, and the monitored thermal stress data and transient data, wherein the transient-related life consumption data and cycle-related life consumption data comprise at least one of measured calculations or instantaneous calculations;
   receiving real-time indications for a consumer demand for energy and a corresponding price for the energy;
   based at least in part on the transient-related life consumption data, cycle-related life consumption data, demand for energy, and corresponding price for the energy, providing a recommendation to operate the HRSG in a particular mode, wherein the particular mode is at least a control scheme, data aggregation, historical retention, or a repair scheme; and
   based at least in part on the recommendation, implementing, via at least one processor, the particular mode.

9. The system of claim 8, wherein the one or more processors are further configured for monitoring mechanical stress data from one or more pressure sensors in communication with the one or more HRSG components.

10. The system of claim 9, wherein the one or more processors are further configured for determining real-time transient-related life consumption data and real-time cycle-related life consumption data associated with the one or more HRSG components based at least in part on the monitored mechanical stress data.

11. The system of claim 8, wherein receiving the HRSG physical design parameters comprises receiving one or more of dimensions, tolerances, construction details, material details, weld details, heat balance envelope, operational envelope, design envelope, material testing properties, manufacture data, quality control data, or inspection data associated with the one or more HRSG components.

12. The system of claim 8, further comprising at least one memory for storing determined real-time cycle-related life consumption data.

13. The system of claim 8, wherein determining real-time cycle-related life consumption data is based at least in part on one or more of stress cycle counting or load cycle counting.

14. The system of claim 8, wherein determining real-time cycle-related life consumption data complies with one or more standards for design and dimensioning of boilers.

15. An apparatus for operating components of a heat recovery steam generator (HRSG), comprising:
   one or more processors in communication with one or more sensors and configured for:
      receiving, via at least one processor, one or more HRSG operational design parameters;
      receiving, via at least one processor, one or more HRSG physical design parameters;
      monitoring, via at least one processor, real-time thermal stress data and real-time transient data from one or more sensors in communication with one or more HRSG components;
      determining, via at least one processor, real-time transient-related life consumption data and real-time cycle-related life consumption data associated with the one or more HRSG components based at least in part on the HRSG operational design parameters, physical design parameters, and the monitored thermal stress data and transient data, wherein the transient-related life consumption data and cycle-related life consumption data comprise at least one of measured calculations or instantaneous calculations;
      receiving real-time indications for a consumer demand for energy and a corresponding price for the energy;
      based at least in part on the transient-related life consumption data, cycle-related life consumption data, demand for energy, and corresponding price for the energy, providing a recommendation to operate the HRSG in a particular mode, wherein the particular mode is at least a control scheme, data aggregation, historical retention, or a repair scheme; and
      based at least in part on the recommendation, implementing, via at least one processor, the particular mode.

16. The apparatus of claim 15, wherein the one or more processors are further configured for monitoring mechanical stress data from one or more pressure sensors in communication with the one or more HRSG components.

17. The apparatus of claim 16, wherein the one or more processors are further configured for determining real-time transient-related life consumption data and real-time cycle-related life consumption data associated with the one or more HRSG components based at least in part on the monitored mechanical stress data.

18. The apparatus of claim 15, wherein receiving the HRSG physical design parameters comprises receiving one or more of dimensions, tolerances, construction details, material details, weld details, heat balance envelope, operational envelope, design envelope, material testing properties, manufacture data, quality control data, or inspection data associated with the one or more HRSG components.

19. The apparatus of claim 15, further comprising at least one memory for storing determined real-time cycle-related life consumption data.

20. The apparatus of claim 15, wherein determining real-time cycle-related life consumption data complies with one or more standards for design and dimensioning of boilers and is based at least in part on one or more of stress cycle counting or load cycle counting.

\* \* \* \* \*